United States Patent
Dropps et al.

(10) Patent No.: US 7,548,560 B1
(45) Date of Patent: Jun. 16, 2009

(54) METHOD AND SYSTEM FOR CHECKING FRAME-LENGTH IN FIBRE CHANNEL FRAMES

(75) Inventors: Frank R. Dropps, Maple Grove, MN (US); Ernest G Kohlwey, Eagan, MN (US); Edward C. Ross, Edina, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 490 days.

(21) Appl. No.: 11/363,365

(22) Filed: Feb. 27, 2006

(51) Int. Cl.
*H04J 3/16* (2006.01)
(52) U.S. Cl. .................. 370/470; 370/401; 370/428
(58) Field of Classification Search .......... 370/351, 370/389, 422, 423, 424, 464, 465, 470, 474; 714/100, 1, 2, 3, 5
See application file for complete search history.

(56) References Cited

U.S. PATENT DOCUMENTS

| | | | |
|---|---|---|---|
| 4,162,375 A | 7/1979 | Schilichte | |
| 4,200,929 A | 4/1980 | Davidjuk et al. | |
| 4,258,418 A | 3/1981 | Heath | |
| 4,344,132 A | 8/1982 | Dixon et al. | |
| 4,425,640 A | 1/1984 | Philip et al. | |
| 4,546,468 A | 10/1985 | Christmas et al. | |
| 4,569,043 A | 2/1986 | Simmons et al. | |
| 4,691,296 A | 9/1987 | Struger | |
| 4,716,561 A | 12/1987 | Angell et al. | |
| 4,725,835 A | 2/1988 | Schreiner et al. | |
| 4,821,034 A | 4/1989 | Anderson et al. | |
| 4,860,193 A | 8/1989 | Bentley et al. | |
| 5,025,370 A | 6/1991 | Koegel et al. | |
| 5,051,742 A | 9/1991 | Hullett et al. | |

(Continued)

FOREIGN PATENT DOCUMENTS

EP        0649098        4/1995

(Continued)

OTHER PUBLICATIONS

Information Technology Industry Council, Fibre Channel: Framing and Signaling-2, Dec. 2004, Rev. 0.50, pp. 76,81,114,115.*

(Continued)

*Primary Examiner*—Ricky Ngo
*Assistant Examiner*—Paul Masur
(74) *Attorney, Agent, or Firm*—Klein, O'Neill & Singh, LLP

(57) ABSTRACT

Method and system for checking frame-length in a Fiber Channel frames is provided. The method includes extracting a R_CTL value from a Fiber Channel frame; comparing the extracted R_CTL value of the Fiber Channel frame with R_CTL values stored in a Content Addressable Memory Table; determining a maximum frame-length and a minimum frame-length of the Fiber Channel frame for the extracted R_CTL value from the Content Addressable Memory Table; and marking the Fiber Channel frame so that it can be discarded if the frame-length is less than the minimum frame-length of the Fiber Channel frame or greater than the maximum frame-length of the Fiber Channel frame. The system includes a processor that accesses a CAM stored in memory; and a receive port that extracts and compares a R_CTL value of the Fiber Channel frame.

24 Claims, 12 Drawing Sheets

U.S. PATENT DOCUMENTS

| | | |
|---|---|---|
| 5,115,430 A | 5/1992 | Hahne et al. |
| 5,144,622 A | 9/1992 | Takiyasu et al. |
| 5,367,520 A | 11/1994 | Cordell |
| 5,579,443 A | 11/1996 | Tatematsu et al. |
| 5,590,125 A | 12/1996 | Acampora et al. |
| 5,594,672 A | 1/1997 | Hicks |
| 5,598,541 A | 1/1997 | Malladi et al. |
| 5,610,745 A | 3/1997 | Bennett |
| 5,677,909 A | 10/1997 | Heide |
| 5,687,172 A | 11/1997 | Cloonan et al. |
| 5,748,612 A | 5/1998 | Stoevhase et al. |
| 5,764,927 A | 6/1998 | Murphy et al. |
| 5,768,271 A | 6/1998 | Seid et al. |
| 5,768,533 A | 6/1998 | Ran |
| 5,790,545 A | 8/1998 | Holt et al. |
| 5,818,842 A | 10/1998 | Burwell et al. |
| 5,821,875 A | 10/1998 | Lee et al. |
| 5,822,300 A | 10/1998 | Johnson et al. |
| 5,894,560 A | 4/1999 | Carmichael et al. |
| 5,936,442 A | 8/1999 | Liu et al. |
| 5,954,796 A | 9/1999 | McCarty et al. |
| 5,974,547 A | 10/1999 | Klimenko |
| 5,987,028 A | 11/1999 | Yang et al. |
| 5,999,528 A | 12/1999 | Chow et al. |
| 6,011,779 A | 1/2000 | Wills |
| 6,014,383 A | 1/2000 | McCarty |
| 6,021,128 A | 2/2000 | Hosoya et al. |
| 6,046,979 A | 4/2000 | Bauman |
| 6,047,323 A | 4/2000 | Krause |
| 6,081,512 A | 6/2000 | Muller et al. |
| 6,128,292 A | 10/2000 | Kim et al. |
| 6,147,976 A | 11/2000 | Shand et al. |
| 6,151,644 A | 11/2000 | Wu |
| 6,160,813 A | 12/2000 | Banks et al. |
| 6,209,089 B1 | 3/2001 | Selitrennikoff et al. |
| 6,229,822 B1 | 5/2001 | Chow et al. |
| 6,230,276 B1 | 5/2001 | Hayden |
| 6,301,612 B1 | 10/2001 | Selitrennikoff et al. |
| 6,308,220 B1 | 10/2001 | Mathur |
| 6,324,181 B1 | 11/2001 | Wong et al. |
| 6,330,236 B1 | 12/2001 | Ofek et al. |
| 6,370,605 B1 | 4/2002 | Chong |
| 6,397,360 B1 | 5/2002 | Bruns |
| 6,411,599 B1 | 6/2002 | Blanc et al. |
| 6,411,627 B1 | 6/2002 | Hullett et al. |
| 6,418,477 B1 | 7/2002 | Verma |
| 6,421,342 B1 | 7/2002 | Schwartz et al. |
| 6,424,658 B1 | 7/2002 | Mathur |
| 6,438,628 B1 | 8/2002 | Messerly et al. |
| 6,449,274 B1 | 9/2002 | Holden et al. |
| 6,457,090 B1 | 9/2002 | Young |
| 6,467,008 B1 | 10/2002 | Gentry et al. |
| 6,522,656 B1 | 2/2003 | Gridley |
| 6,570,850 B1 | 5/2003 | Gutierrez et al. |
| 6,597,691 B1 | 7/2003 | Anderson et al. |
| 6,597,777 B1 | 7/2003 | Ho |
| 6,606,690 B2 | 8/2003 | Padovano |
| 6,684,209 B1 | 1/2004 | Ito et al. |
| 6,697,359 B1 | 2/2004 | George |
| 6,718,497 B1 | 4/2004 | Whitby-Strevens |
| 6,760,302 B1 | 7/2004 | Ellinas et al. |
| 6,779,083 B2 | 8/2004 | Ito et al. |
| 6,785,241 B1 | 8/2004 | Lu et al. |
| 6,859,435 B1 | 2/2005 | Lee et al. |
| 6,865,157 B1 | 3/2005 | Scott et al. |
| 6,901,072 B1 | 5/2005 | Wong |
| 6,934,799 B2 | 8/2005 | Acharya et al. |
| 6,987,768 B1 | 1/2006 | Kojima et al. |
| 6,988,130 B2 | 1/2006 | Blumenau et al. |
| 6,988,149 B2 | 1/2006 | Odenwald |
| 7,010,607 B1 | 3/2006 | Bunton |
| 7,024,410 B2 | 4/2006 | Ito et al. |
| 7,051,182 B2 | 5/2006 | Blumenau et al. |
| 7,061,871 B2 | 6/2006 | Sheldon et al. |
| 7,120,728 B2 | 10/2006 | Krakirian et al. |
| 7,215,680 B2 | 5/2007 | Mullendore et al. |
| 7,233,985 B2 | 6/2007 | Hahn et al. |
| 7,263,593 B2 | 8/2007 | Honda et al. |
| 7,269,168 B2 | 9/2007 | Roy et al. |
| 7,277,431 B2 | 10/2007 | Walter et al. |
| 7,287,063 B2 | 10/2007 | Baldwin et al. |
| 7,315,511 B2 | 1/2008 | Morita et al. |
| 7,352,740 B2 | 4/2008 | Hammons et al. |
| 7,397,788 B2 | 7/2008 | Mies et al. |
| 7,406,034 B1 | 7/2008 | Cometto et al. |
| 2001/0033552 A1 | 10/2001 | Barrack et al. |
| 2002/0034178 A1 | 3/2002 | Schmidt et al. |
| 2002/0118692 A1 | 8/2002 | Oberman et al. |
| 2002/0124124 A1 | 9/2002 | Matsumoto et al. |
| 2002/0194294 A1 | 12/2002 | Blumenau et al. |
| 2002/0196773 A1 | 12/2002 | Berman |
| 2003/0016683 A1 | 1/2003 | George et al. |
| 2003/0026267 A1 | 2/2003 | Oberman et al. |
| 2003/0035433 A1 | 2/2003 | Craddock et al. |
| 2003/0046396 A1 | 3/2003 | Richter et al. |
| 2003/0072316 A1 | 4/2003 | Niu et al. |
| 2003/0093607 A1 | 5/2003 | Main et al. |
| 2003/0118053 A1* | 6/2003 | Edsall et al. ................. 370/474 |
| 2003/0120743 A1 | 6/2003 | Coatney et al. |
| 2003/0120983 A1 | 6/2003 | Vieregge et al. |
| 2003/0126242 A1 | 7/2003 | Chang |
| 2003/0131105 A1 | 7/2003 | Czeiger et al. |
| 2003/0172149 A1 | 9/2003 | Edsall et al. |
| 2003/0172239 A1 | 9/2003 | Swank |
| 2003/0174721 A1 | 9/2003 | Black et al. |
| 2003/0179748 A1 | 9/2003 | George et al. |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0195983 A1 | 10/2003 | Krause |
| 2004/0013088 A1 | 1/2004 | Gregg |
| 2004/0013092 A1 | 1/2004 | Betker et al. |
| 2004/0013125 A1 | 1/2004 | Betker et al. |
| 2004/0028038 A1 | 2/2004 | Anderson et al. |
| 2004/0054866 A1 | 3/2004 | Blumenau et al. |
| 2004/0081196 A1 | 4/2004 | Elliott |
| 2004/0092278 A1 | 5/2004 | Diepstraten et al. |
| 2004/0120340 A1* | 6/2004 | Furey et al. ................. 370/429 |
| 2004/0141521 A1 | 7/2004 | George et al. |
| 2004/0153526 A1 | 8/2004 | Haun et al. |
| 2005/0047334 A1 | 3/2005 | Paul et al. |
| 2005/0188245 A1* | 8/2005 | Seto et al. ..................... 714/5 |
| 2006/0143300 A1 | 6/2006 | See et al. |
| 2006/0274744 A1 | 12/2006 | Nagai et al. |

FOREIGN PATENT DOCUMENTS

| | | |
|---|---|---|
| EP | 0856969 | 8/1998 |
| WO | WO-98/36537 | 8/1998 |

OTHER PUBLICATIONS

Clark, Tom, "Zoning for Fibre Channel Fabrics", *Vixel Corporation Paper-XP002185194*, (Aug. 1999), 1-6.

Desanti, "Virtual Fabrics", *Virtual Fabrics, T11/03-352v0*, (May 2003), 1-4.

Desanti, Claudio, "Virtual Fabrics Switch Support", *VF Switch Support, T11/04-395v2*, (Sep. 2004), 1-15.

Malavalli, Kumar, "Distributed Computing With Fibre Channel Fabric", *Proc. of the Computer Soc. Int'l Conf.*, Los Alamitos, *IEEE Comp. Soc. Press.*, vol. Conf. 37, XP000340745, (Feb. 24, 1992), 269-274.

Martin, Charles R., "Fabric Interconnection of Fibre Channel Standard Nodes", *Proceedings of the SPIE*, (Sep. 8, 1992), 65-71.

Martin, "Virtual Channel Architecture", *Presentation By Brocade to T11/03-369V0*, (Feb. 2003).
Melhem, et al., "Minimizing Wavelength Conversions in WDM Path Establishment", *Computer Science Department, University of Pittsburgh*, Pittsburgh, PA 15260, (2001),197-211.
Pelissier, "Inter-Fabric Routing", *Inter Fabric Routing (04-520v0)*, (Jul. 30, 2004),1-31.
Yoshida, Hu , "LUN Security Considerations for Storage Area Networks", *Hitachi Data Systems Paper—XP 002185193 (1999)*, 1-4.
"Notice of Allowance from USPTO dated Jun. 25, 2008 for U.S. Appl. No. 10/894,491".
"Office Action from USPTO dated Jun. 26, 2008 for U.S. Appl. No. 10/894,547".
"Office Action from USPTO dated Jun. 27, 2008 for U.S. Appl. No. 10/894,726".
"Office Action from USPTO dated Mar. 7, 2008 for U.S. Appl. No. 10/894,629".
"Fibre Channel Switch Fabric—2(FC-SW-2) Rev 5.4 NCITS Working Draft Proposed American National Standard for Information Technology", *T11/Project 1305-D/Rev 5.4*, (Jun. 2001).
"Fibre Channel Generic Services—3 (FC-GS-3) Rev. 7.01, NCITS Working Draft Proposed American National Standard for Information Technology,", *T11/Project 1356 D/Rev 7.01*, (Nov. 28, 2000).
"Office Action from USPTO dated Oct. 11, 2007 for U.S. Appl. No. 10/894,629".
"Office Action from USPTO dated Oct. 25, 2007 for U.S. Appl. No. 10/894,536".
"Notice of Allowance from USPTO dated Jan. 11, 2008 for U.S. Appl. No. 10/664,548".
"Office Action from USPTO dated Jul. 3, 2007 2007 for U.S. Appl. No. 10/664,548".
"Office Action from USPTO dated Sep. 20, 2007 for U.S. Appl. No. 10/798,527".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Apr. 14, 2008 for U.S. Appl. No. 10/894,627".
"Office Action from USPTO dated Apr. 17, 2008 for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 29, 2008 for U.S. Appl. No. 10/894,491".
"Office Action from USPTO dated May 14, 2008 for U.S. Appl. No. 10/956,502".
"Office Action from USPTO dated May 15, 2008 for U.S. Appl. No. 10/798,527".
"Office Action from USPTO dated Apr. 3, 2008 for U.S. Appl. No. 10/894,587".
"Office Action from USPTO dated Apr. 4, 2008 for U.S. Appl. No. 10/957,465".
"Notice of Allowance from USPTO dated Jul. 9, 2008 for U.S. Appl. No. 10/894,629".
"Notice of Allowance from USPTO dated Jul. 17, 2008 for U.S. Appl. No. 10/894,536".
"Non-Final Office Action from USPTO dated Oct. 10, 2008 for U.S. Appl. No. 10/894,627".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798,527".
"Final Office Action from USPTO dated Nov. 13, 2008 for U.S. Appl. No. 10/894,587".
"Office Action from USPTO dated Nov. 26, 2008 for U.S. Appl. No. 10/956,502".
"Office Action from USPTO dated Nov. 26, 2008 for U.S. Appl. No. 10/894,547".
"Final Office Action from USPTO dated Dec. 24, 2008 for U.S. Appl. No. 10/894,726".

* cited by examiner

CAM TABLE 300

| R_CTL | Maximum Length (Bytes) | Minimum Length (Bytes) |
|---|---|---|
| 0x50 | 2156 | 44 |
| 0x51 | 2156 | 44 |
| 0x52 | 2180 | 68 |
| - | - | |
| - | - | |
| - | - | |
| Default | 2148 | 36 |

FIGURE 3A

METHOD AND SYSTEM FOR CHECKING FRAME-LENGTH IN FIBRE CHANNEL FRAMES

CROSS REFERENCE TO RELATED APPLICATIONS

This patent application is related to the following US Patent Applications:

Ser. No. 10/894,627 filed on Jul. 20, 2004, entitled "Method and System for Programmable Data Dependent Network Routing"; and Ser. No. 10/894,547, filed on Jul. 20, 2004, entitled "Method and System for Using Extended Fabric Features with Fibre Channel Switch Elements"; the disclosure of the foregoing applications is incorporated herein by reference in their entirety.

BACKGROUND

1. Field of the Invention

The present invention relates to Fibre Channel network systems, and more particularly, to checking frame-length in Fibre Channel frames.

2. Background of the Invention

Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

Fibre Channel fabric devices include a node port or "N_Port" that manages fabric connections. The N_port establishes a connection to a fabric element (e.g., a switch) having a fabric port or "F_port".

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes it to another port.

Fibre Channel frames carry information between Fibre Channel Devices which include Host Bus Adapters, Switches and Disk Drives. The components of a Fibre Channel Frame include SOF, Frame Header, Payload, CRC and EOF. Typically, the minimum frame-length of a Fibre frame is 36 bytes and the maximum frame-length of a Fibre Channel frame is 2148 bytes.

Typically, a Fibre Channel device receives an incoming Fibre Channel frame when it detects a Start-Of-Frame (SOF) delimiter. The receive port detects an end of the Fibre Channel frame when it detects an End-Of-Frame (EOF) delimiter or if the maximum frame-length is reached. The receive port of the Fibre Channel device keeps a count of the frame-length of the Fibre Channel frame. The frame-length includes the summation of the length of SOF (4 bytes), Frame Header (24 bytes), Payload (0-2112 bytes), CRC (4 bytes) and EOF (4 bytes). The receive port then determines if the frame-length of the received Fibre Channel frame is within the minimum and maximum frame-length as specified in the Fibre Channel specification. If a violation of the frame-length occurs, then the frame is discarded and an error is reported to a processor.

With the addition of new routing features for example, Virtual Fabric and Inter-Fabric routing, the length of the Frame Header has changed. This addition caused the total frame-length of the Fibre Channel frame to be different than the current maximum and minimum frame-length. When a switch that was designed before these features were introduced receives a Fibre Channel frame, data is corrupted if the EOF is not detected due to the varying lengths of the frame. Furthermore, the current frame-length checking mechanism causes erroneous errors. Therefore, there is a need for a method and system for efficiently checking the frame-length of a Fibre Channel frame with varying frame lengths.

SUMMARY OF THE INVENTION

In one aspect of the present invention, a method for checking frame-length in a Fibre Channel frames is provided. The method includes extracting a R_CTL value from a Fibre Channel frame; comparing the extracted R_CTL value of the Fibre Channel frame with R_CTL values stored in a Content Addressable Memory Table; determining a maximum frame-length and minimum frame-length of the Fibre Channel frame for the extracted R_CTL value from the Content Addressable Memory Table; and marking the Fibre Channel frame so that it can be discarded, if the frame-length is less than the minimum frame-length of the Fibre Channel frame or greater than the maximum frame-length of the Fibre Channel frame.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 3A shows an example of a Content Addressable Memory Table that maintains R_CTL, maximum frame-length and minimum frame-length information, according to one aspect of the present invention.

DETAILED DESCRIPTION OF THE PREFERRED EMBODIMENTS

Definitions:

The following definitions are provided for convenience as they are typically (but not exclusively) used in the Fibre Channel environment, implementing the various adaptive aspects of the present invention.

"CRC" (cyclic redundancy code): A 4 byte value used for checking the data integrity of a Fibre Channel frame.

"D_ID": A 24-bit Fibre Channel header field that contains the destination address for a frame.

"Dword: A 4 byte Fibre Channel Data Word.

"EOF": End-Of-Frame (EOF) delimiter that is the last Data Word of a Fibre Channel frame.

"EOFa": A frame whose EOF is marked so that the frame is discarded by a destination port, N_Port or NL_Port.

"E_Port": An expansion port that is used to connect Fibre Channel Switch elements in a Fabric.

"Fabric": The structure or organization of a group of switches, target and host devices (NL_Port, N_ports etc.).

"F_Port": A port to which non-loop N_Ports are attached to a fabric and does not include FL_ports.

"Fibre Channel ANSI Standard" ("FC-FS-2"): The standard (incorporated herein by reference in its entirety) describes the physical interface, transmission and signaling protocol of a high performance serial link for support of other high level protocols associated with IPI, SCSI, IP, ATM and others.

"Inter Fabric Header": The Inter Fabric Routing Extended Header (IFR_Header) is used for routing Fibre Channel frames from one fabric to another. It provides the fabric identifier of the destination fabric, the fabric identifier of the source fabric and information to determine hop count.

"N_Port": A direct fabric attached port, for example, a disk drive or a HBA.

"NL_Port": A L_Port that can perform the function of a N_Port.

"R_CTL": A 8 bit value containing routing information used to route Fibre Channel Frames.

"Switch": A fabric element conforming to the Fibre Channel Switch standards.

"SOF": Start_of_Frame (SOF) delimiter that is the first Data Word of a Fibre Channel frame.

"Virtual Fabric" ("VSAN"): As defined by FC-FS-2, Fibre Channel standard, incorporated herein by reference in its entirety, is a Fabric composed of partitions and N_ports having the properties of a single Fabric management domain and Generic Services; and independent from other Virtual Fabrics (e.g. an independent address space).

"Virtual Fabric Header" (VFT_Header): This is a header used for tagging Fibre Channel frames with a Virtual Fabric Identifier (VF_ID) of Virtual Fabric to which the frame belongs.

"Virtual Fabric Identifier" ("VF_ID"): A value that uniquely identifies a Virtual Fabric among plural Virtual Fabrics that shares a set of Switches and N_ports.

To facilitate an understanding of the preferred embodiment, the general architecture and operation of a Fibre channel System and a Fibre Channel switch element will be described. The specific architecture and operation of the preferred embodiment will then be described with reference to the general architecture.

Fibre Channel System

Figure 1A:
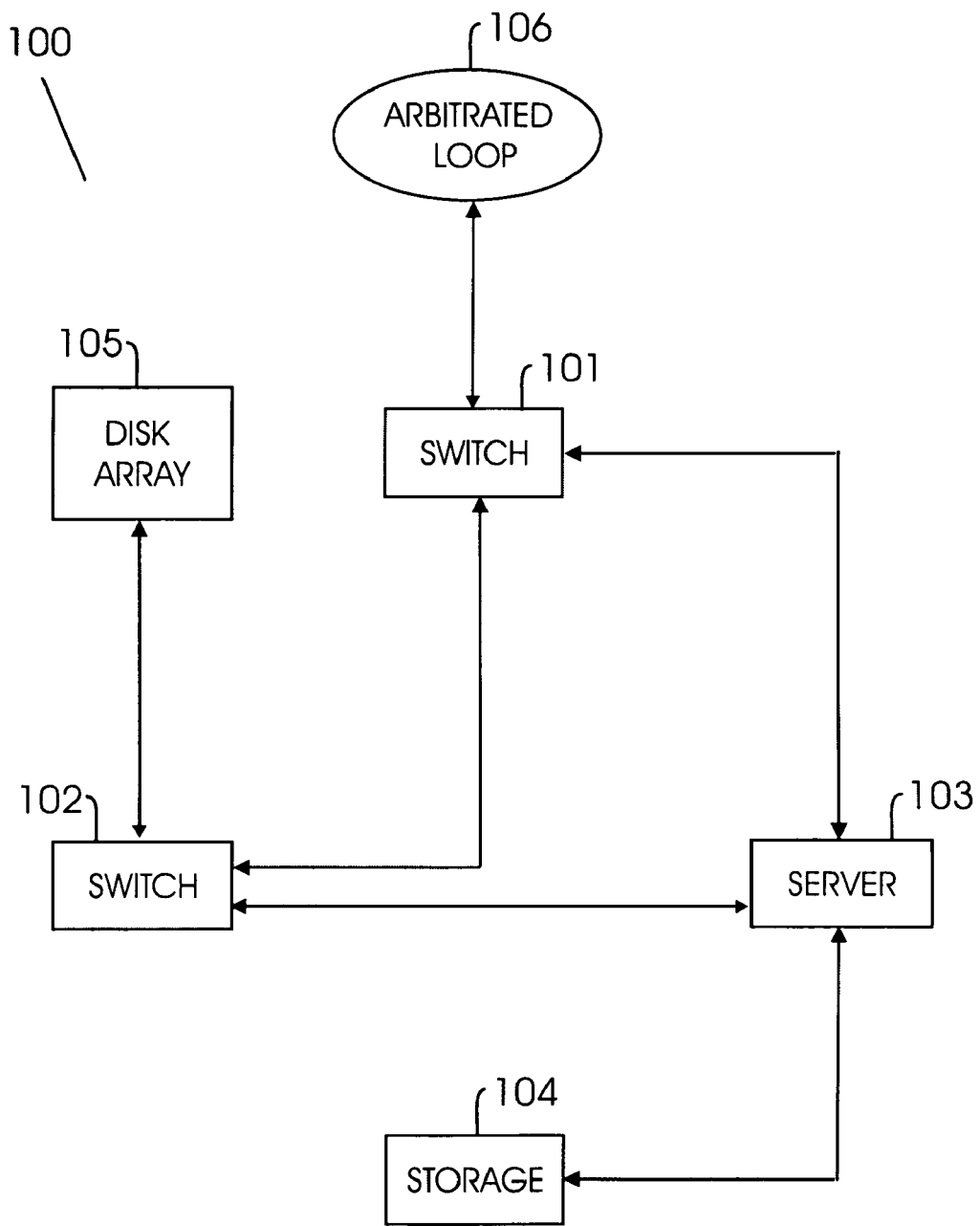
FIG. 1A shows an example of a network system used according to one aspect of the present invention.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fibre Channel Switch Element

Figure 1B:
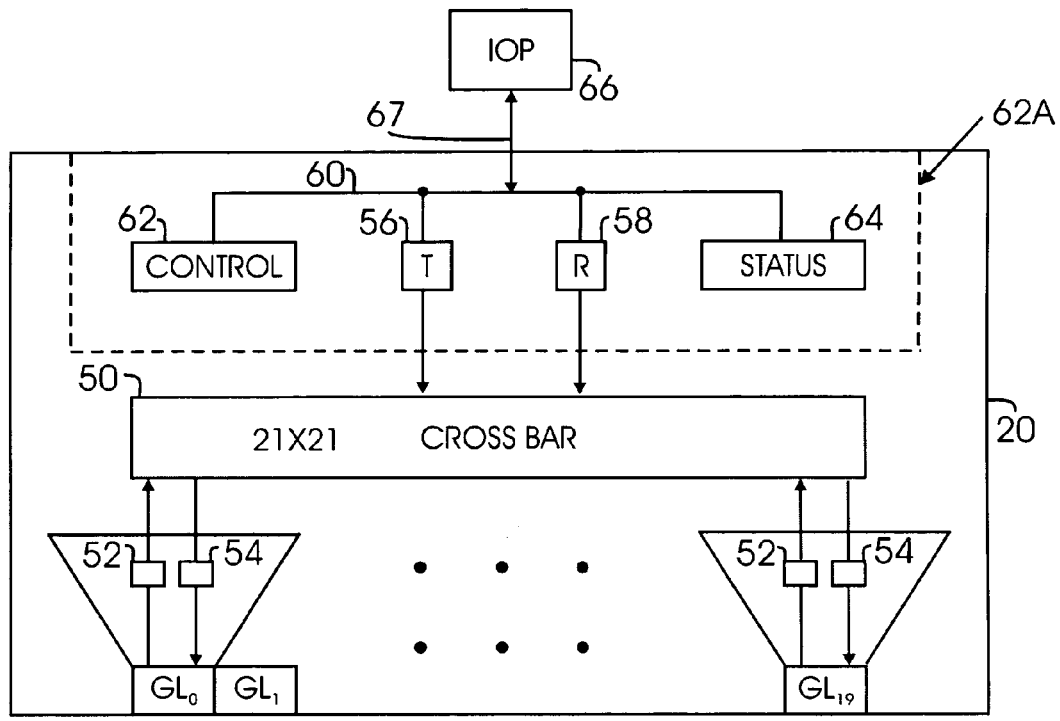
FIG. 1B shows an example of a Fibre Channel switch element, according to one aspect of the present invention.

FIB. 1B is a block diagram of a 20-port ASIC fabric element according to one aspect of the present invention. FIG. 1B provides the general architecture of a 20-channel switch chassis using the 20port fabric element. Fabric element includes ASIC 20 with non-blocking Fibre Channel class 2 (connectionless, acknowledged) service and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 is comprised of transmit and receive connections to switch crossbar 50. Within each port, one connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

In the preferred embodiments of switch chassis described herein, the fabric controller is a firmware-programmed microprocessor, also referred to as the input/output processor ("IOP"). As seen in FIG. 1B, bi-directional connection to IOP 66 is routed through port 67, which connects internally to a control bus 60. Transmit buffer 56, receives buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

Figure 1C:
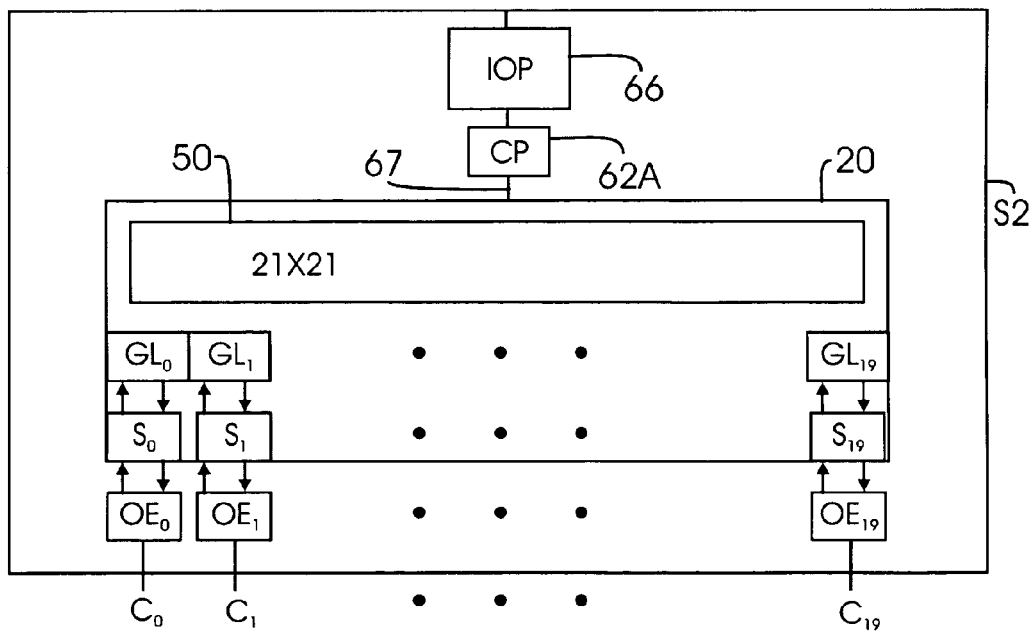
FIG. 1C shows a block diagram of a 20-channel switch chassis, according to one aspect of the present invention.

FIG. 1C shows a 20-channel switch chassis S2 using ASIC 20 and IOP 66. IOP 66 in FIG. 1C is shown as a part of a switch chassis utilizing one or more of ASIC 20. S2 will also include other elements, for example, a power suplpy (not shown). The 20 GL_Ports correspond to channels C0-C19. Each GL_Port has a serial/deserializer (SERDES) designated as S0-S19. Ideally, the SERDES functions are implemented on ASIC 20 for efficiency, but may alternatively be external to each GL_Port. The SERDES converts parallel data into a serial data stream for transmission and converts received serial data into parallel data. The 8 bit to 10 bit encoding enables the SERDES to generate a clock signal from the received data stream.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
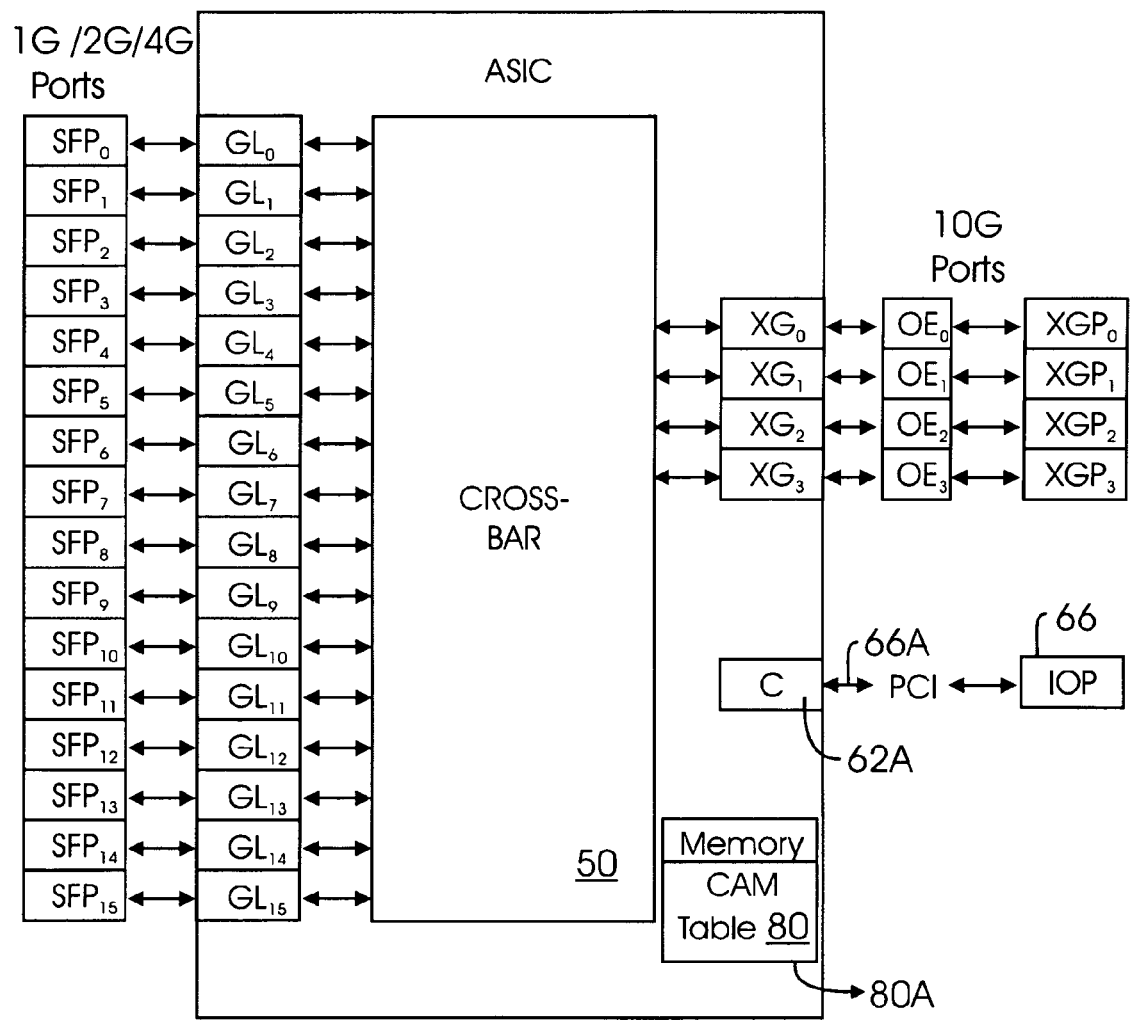
FIG. 1D shows a block diagram of a Fibre Channel switch element with sixteen GL_Ports and four 10 G ports, according to one aspect of the present invention.

FIG. 1D shows a block diagram of ASIC 20 with sixteen GL ports and four 10 G (Gigabyte) port control modules designated as XG0-XG3 for four 10 G ports designated as XGP0-XGP3. ASIC 20 include a control port 62A that is coupled to IOP 66 through a PCI connection 66A. ASIC 20Q also includes a Content Addressable Memory (CAM) Table 80 that maintains information regarding R_CTL, minimum Fibre Channel frame-length and maximum Fibre Channel frame-length.

CAM table 80 is stored in memory 80A that is accessible to IOP 66 and other logic. CAM table 80 is a master copy for the switch element. As described below, each port can have its own CAM table with values that pertain to that particular port. Furthermore, plural ports can share a CAM Table that is located at one of the ports.

Figures 1, 1E:
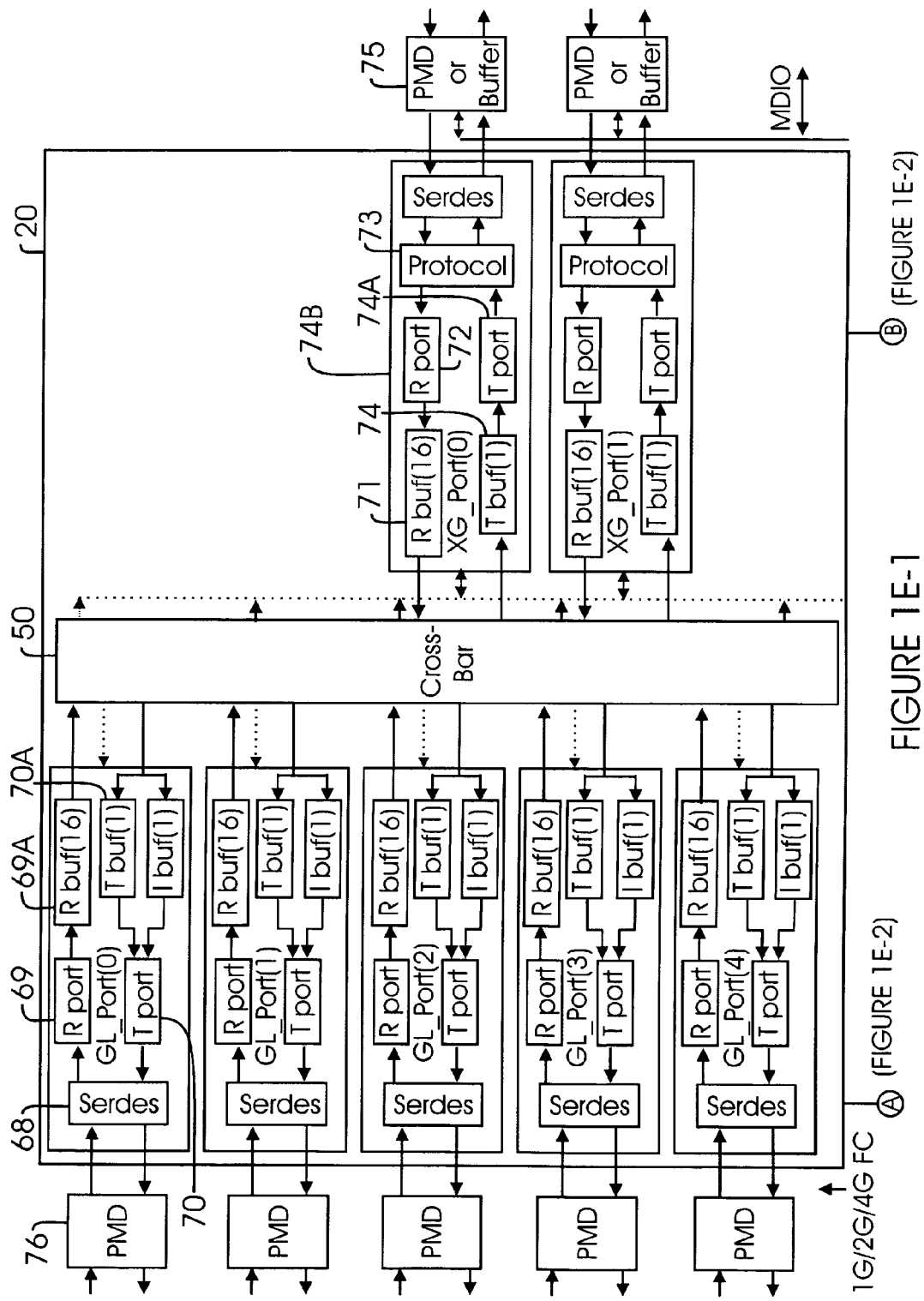
FIG. 1E-1/1E-2 shows a top-level block diagram of a switch element used according to one aspect of the present invention.
Figures 1, 1E, 2:
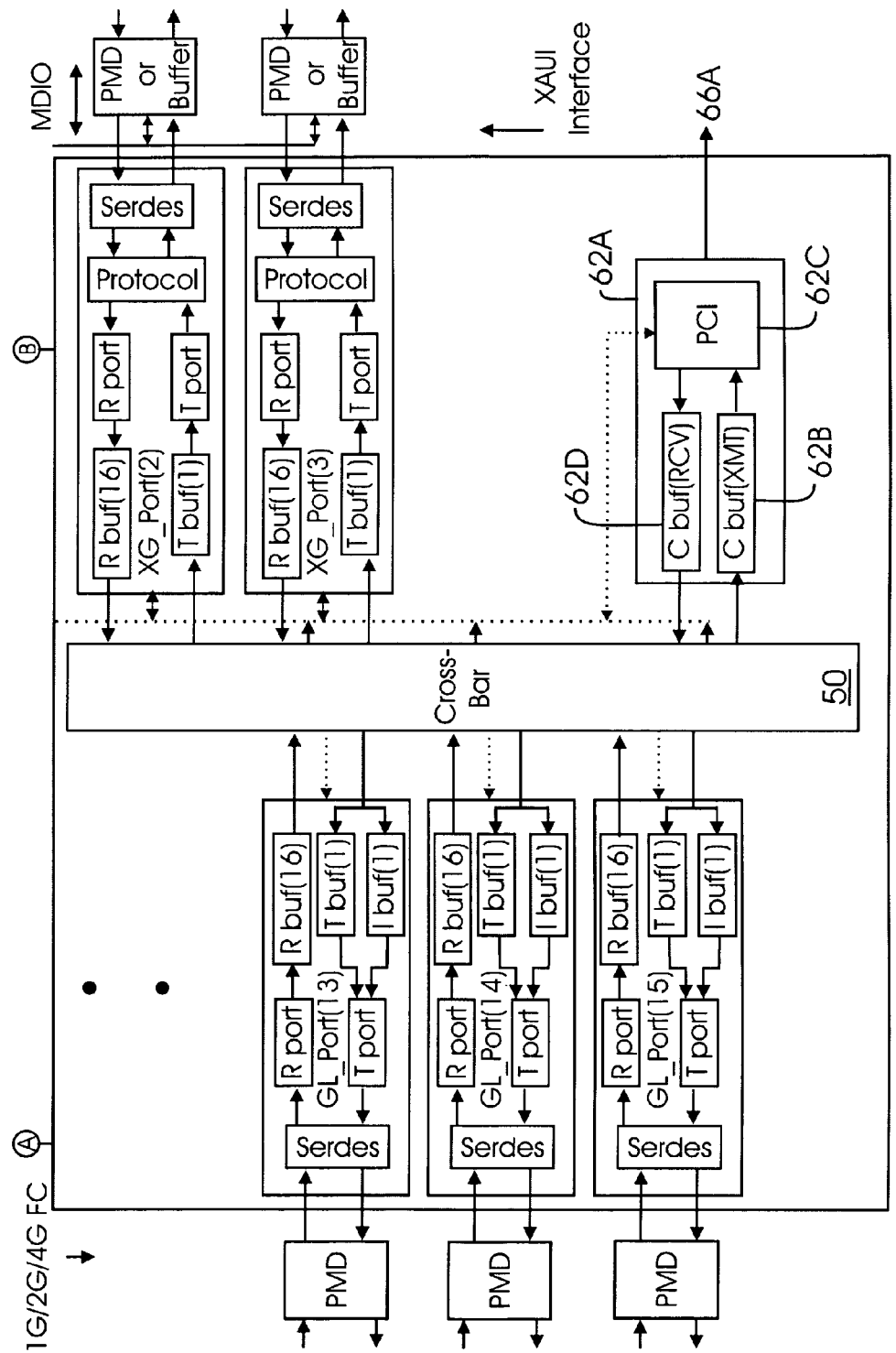

FIGS. 1E-1/1E-2 (jointly referred to as FIG. 1E) show yet another block diagram of ASIC 20 with sixteen GL and four XG port control modules. Each GL port control module has a Receive port (RPORT) 69 (similar to 58, FIG. 1B) with a receive buffer (RBUF) 69A (similar to 58, FIG. 1B) and a transmit port 70 with a transmit buffer (TBUF) 70A (similar to 56, FIG. 1B). GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF 74B and TPORT 74A similar to TBUF 70A and TPORT 70. Protocol module 73 interfaces with SERDES to handle protocol based functionality.

Incoming frames are received by RPORT 69 via SERDES 68 and then transmitted using TPORT 70. Buffers 69A and 70A are used to stage frames in the receive and the transmit path.

Figure 1F:
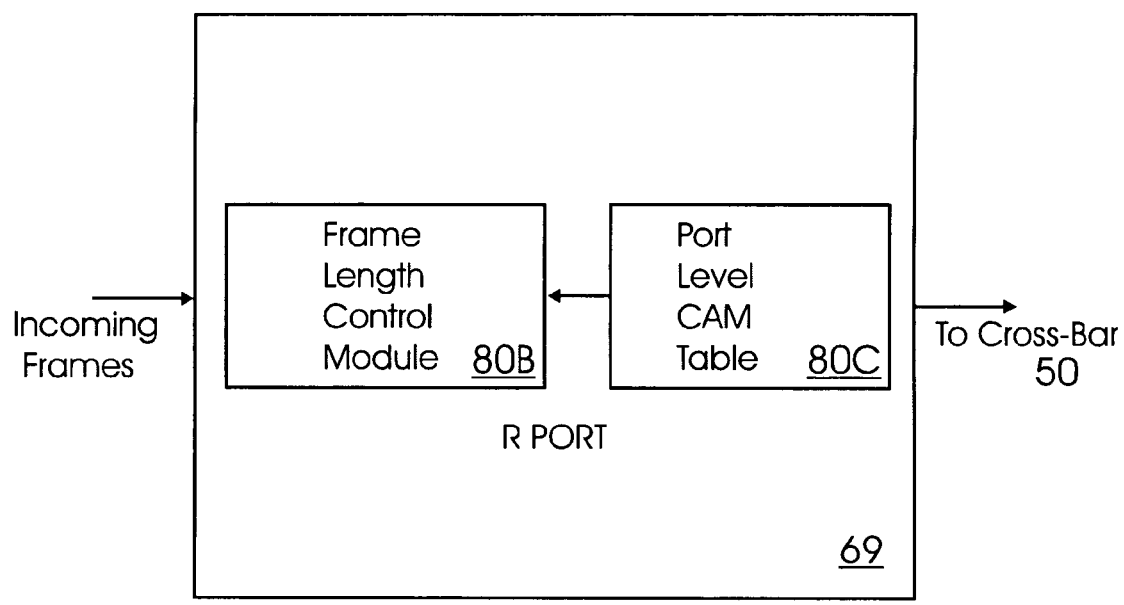
FIG. 1F shows a block diagram of a receive port using a Frame Control Module and a CAM Table, according to one aspect of the present invention.

FIG. 1F shows a top-level block diagram of a receive port 69 that includes a frame length control module 80B (or Control module 80B) and a port level CAM table 80C. CAM Table 80C is described below with respect to FIG. 3B.

CAM Table 80C can be loaded with different values for each port. It is noteworthy that each port may have its own table 80C or table 80C can be shared between plural ports. In contrast, CAM table 80 is the master copy and includes information regarding all the ports.

It is also noteworthy that receive port 69 includes various other components that are described in co-pending patent application Ser. No. 10/894,627, filed on Jul. 20, 200, the disclosure of which is incorporated herein by reference.

Figure 1G:
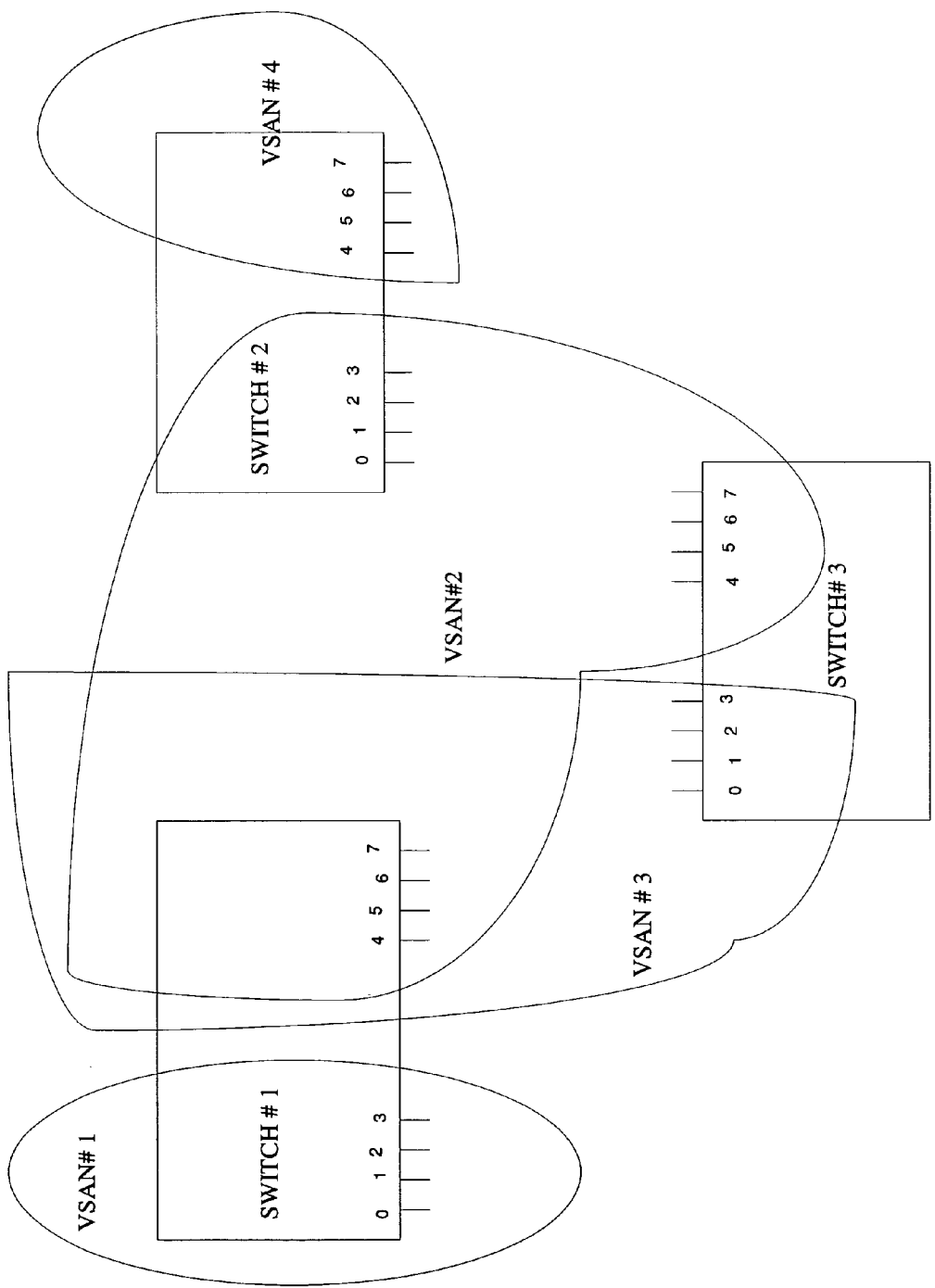
FIG. 1G shows a block diagram illustrating Virtual SANs, used according to one aspect of the present invention.

FIG. 1G shows a top-level block diagram for Virtual Fabrics (VSANs), which use the extended headers, according to one aspect of the present invention. FIG. 1G shows three Fabric switches, 1, 2 and 3. Each switch has 8-ports labeled 0-7. It is noteworthy that the present invention is not limited to any particular number/type of ports.

VSAN #1 is the first Virtual Fabric that includes ports 0-3 for Switch #1. VSAN #2 includes Switch #1, ports 4-7; Switch #2, ports 0-3; and Switch #3, ports 0-3. VSAN #3 includes Switch #1, ports 4-7 and Switch #3, ports 0-3. VSAN #4 includes Switch #2, ports 4-7.

Figure 1H:
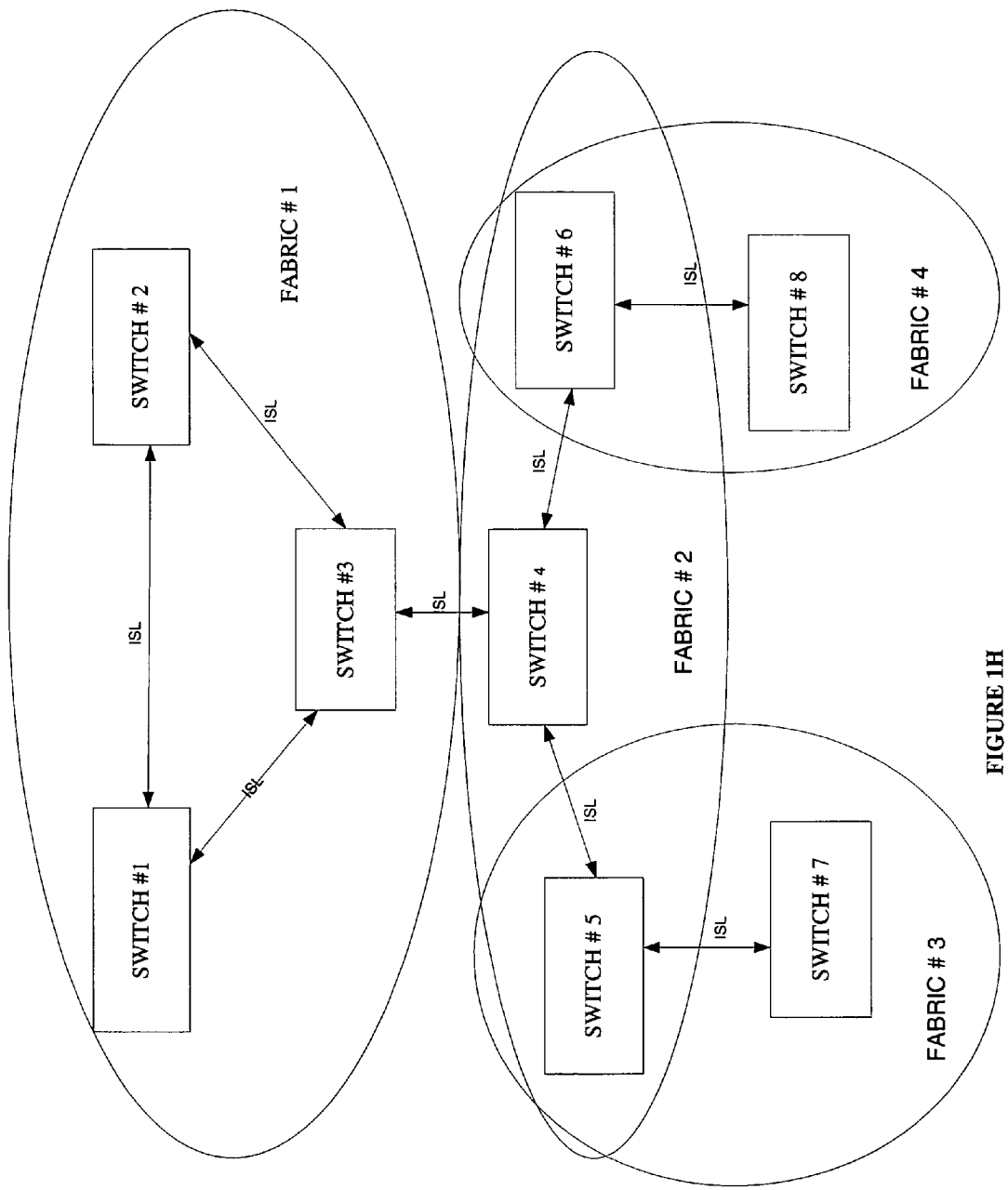
FIG. 1H shows the Inter-Fabric structure that uses an extended frame header, processed according to one aspect of the present invention.

FIG. 1H shows an example of Inter-Fabric connections where an extended frame header is used and processed, according to one aspect of the present invention. Eight Fabric switch are shown (numbered 1 through 8) to illustrate Inter-Fabric routing. Switch #1 is coupled to Switch #2, while Switch #3 is coupled to Switch #1 and 2. Fabric 1 includes Switch #1, 2, and 3.

Fabric 2 includes Switch 4, 5 and 6. Fabric 3 includes Switch 5 and Switch 7, while Fabric 4 includes Switch 6 and Switch 8. The extended headers are used to route frames between the plural Fabrics, for example, between Fabric 1 and Fabric 4. It is noteworthy that the present invention is not limited to any particular number of Fabrics or switches.

Fibre Channel Frame

Figure 2A:
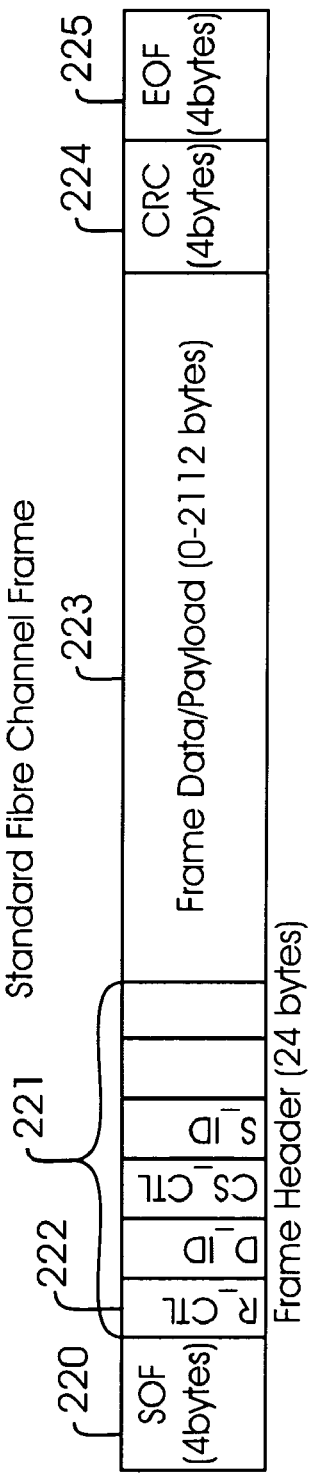
FIG. 2A shows a standard Fibre Channel Frame, used according to one aspect of the present invention.
Figure 2B:
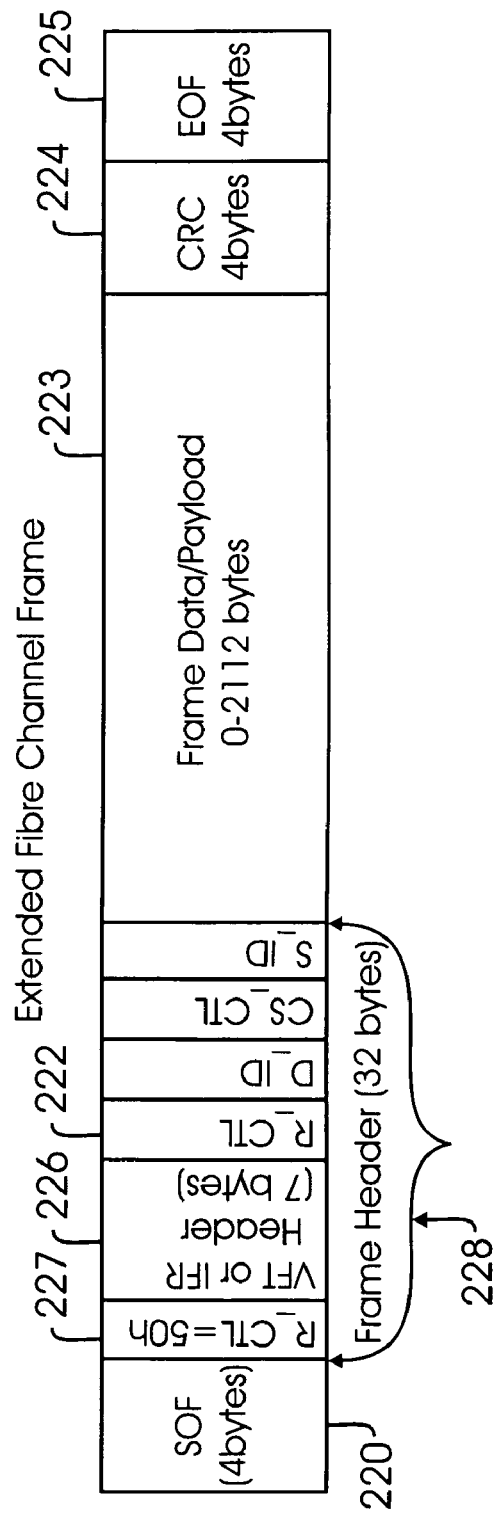
FIG. 2B shows an extended Fibre Channel frame processed according to one aspect of the present invention.

FIG. 2A shows the components of a typical Fibre Channel Frame, according to one aspect of the present invention; and FIG. 2B shows an example of a Fibre Channel frame with additional headers (228).

Receive port 69 detects a frame when a SOF 220 is received. SOF 220 is 4 bytes long and indicates the start of a frame. Receive port 69 starts counting frame-length when it detects a SOF 220.

Frame header 221, which contains routing and control information follow SOF 220. Frame header 221 comprises 6 header Dwords or 24 bytes. In a standard frame, these include R_CTL field 222, D_ID (3 bytes), CS_CTL (3 bytes), S_ID (3 bytes) and reserved bytes. R_CTL field 222 identifies the type of frame.

New routing features have added additional header words 226 to the frame header 221. The additional frame header (32 bytes) is shown in FIG. 2B as 228. Examples of the new routing features include Virtual Fabric header and Inter-Fabric routing headers (shown as 226).

Frame header 228 uses two R_CTL values. R_CTL value of $50_h$ or $51_h$ (shown as 227, FIG. 2B) is used to identify a frame with an extended header, while R_CTL 222 is used to identify the type of frame. The total frame-length of a Fibre Channel frame depends on the frame header 221 or 228, which in turn depends on R_CTL 222 or 227 values.

Payload or data field 223 follows the frame header 221 (or 228, FIG. 2B). The length of the payload varies between a minimum of 0 bytes and a maximum of 2112 bytes. The maximum length of the payload has not changed for the new routing features. It is noteworthy that the adaptive aspects of the present invention are not limited to any particular payload size or R_CTL value.

CRC 224, which is 4 bytes long, follows the payload 223. This field is used to check the data integrity of the frame.

EOF 225, which is 4 bytes long, follows the CRC 224. EOF indicates the end of a frame. When an EOF 225 is detected, receive port 69 stops counting frame-length and stores the value for future comparison and/or frame processing.

Process Flow for Checking Frame-Length

Figure 2C:
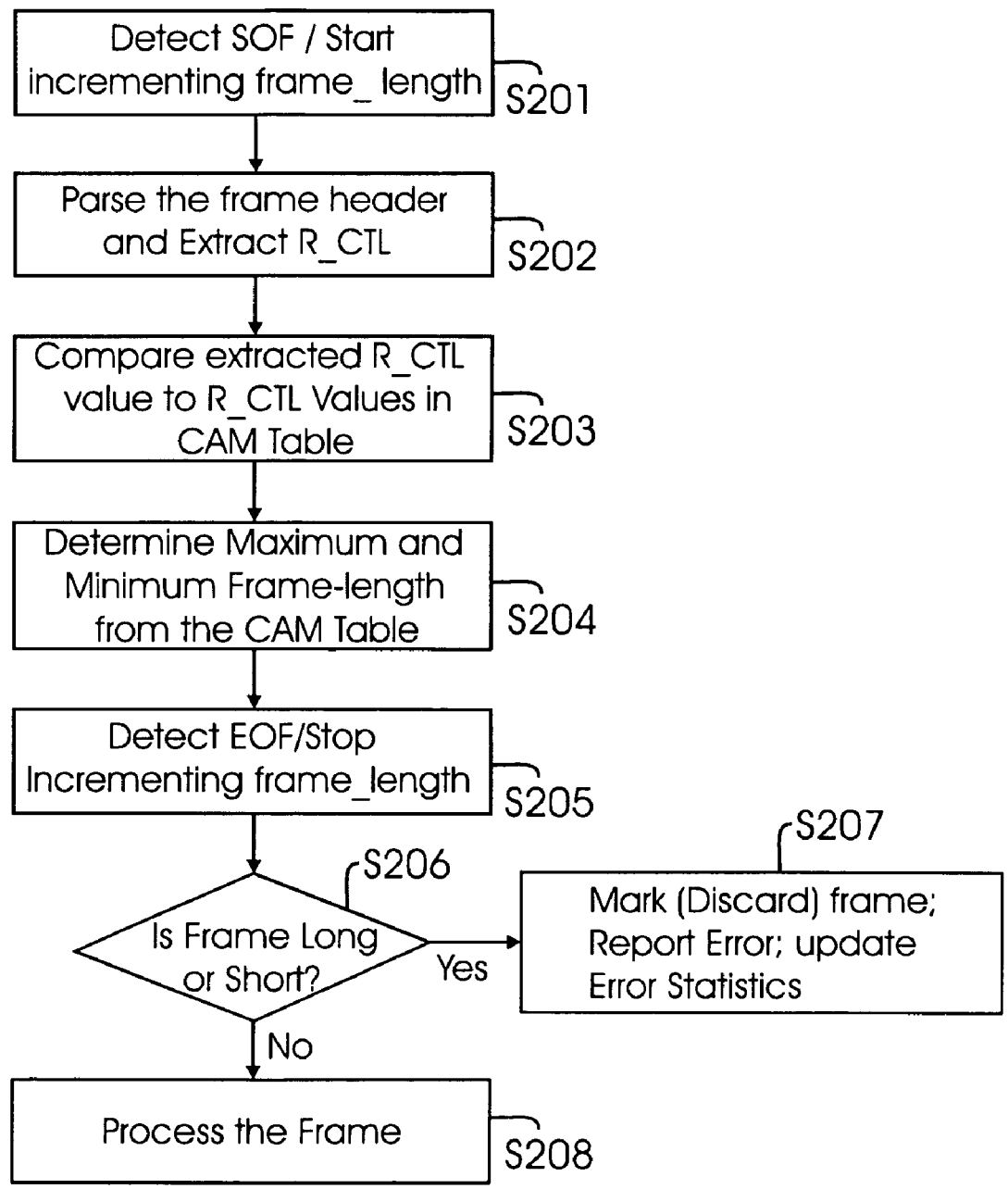
FIG. 2C shows a top-level flow chart for processing Fibre Channel frames, according to one aspect of the present invention.

FIG. 2C shows a top-level flow chart for checking frame-length in a Fibre Channel frame, according to one aspect of the present invention. It is noteworthy that this process flow chart is applicable to any Fibre Channel device that needs to route frames and faces the same issues as a switch element. Although the examples herein are based on a switch element, the present invention is not limited to a switch element and other devices, for example, a host bus adapter, can also use these inventive features.

Turning in detail to FIG. 2C, in step S201, receive port 69 starts receiving a Fibre Channel frame when it detects a SOF. The receive port 69 starts counting frame-length of the received frame. The frame-length counter (not shown) is incremented by 4 bytes when the receive port 69 receives a data word. It is noteworthy that Fibre Channel data could be received in chunks of 4 bytes (Dword) on every clock. The frame length counter can count bits, bytes, Dwords or other values, and the adaptive aspects of the present invention are not limited to any particular type of counter.

In step S202, receive port 69 parses the frame and R_CTL value 222 (or 227) is extracted from the frame header 221.

In step S203, R_CTL value 222 (or 227) is compared with the R_CTL values stored in a CAM Table 80 (or 80C). CAM Table 80, which maintains information regarding R_CTL and frame-length values, is described below with respect to FIG. 3A.

In step S204, a maximum frame-length and a minimum frame-length is determined from the fields corresponding to the matched R_CTL value. If none of the values match the R_CTL value then the default (or programmed) maximum frame-length (for example, 2148 bytes) and minimum frame-length (for example, 36 bytes) are used. The maximum frame-length and minimum frame-length values from the Frame length CAM are stored for future comparison.

In step S205, receive port 69 stops incrementing the received frame-length value when it detects an EOF or error condition.

In step S206, the received frame-length is compared with the stored maximum and minimum frame-length values to determine if the received Fibre Channel frame is a long or short frame. A Fibre Channel frame is a long frame if the received frame-length is greater than the maximum frame-length and a Fibre Channel frame is a short frame if the frame-length is less than the minimum frame-length.

It is noteworthy that the present invention is not limited to any particular format for the maximum and/or minimum frame length comparison. For example, frame length value when compared could be the actual frame length value or as an offset value.

If the Fibre Channel frame is determined to be a long or short frame in step S206, then in step S207, the Fibre Channel frame is marked for discarding. For example, the EOF value may be set to EOFa, which denotes that the frame should be discarded. When the frame is marked then it is discarded by a destination, for example, a host bus adapter or a storage device.

In another aspect of the present invention, the frame that is too long or short is discarded in step S207. In the alternative, a long frame is truncated to a maximum length and a short frame is padded to the minimum length and the EOF value is replaced by an EOFa (as stated above, this denotes EOF abort). Thereafter, the receive port 69 optionally notifies IOP 66 of the error and records the error statistics for the port.

In step S208, receive port 69 processes the received Fibre Channel frame if the frame is not a long or short frame in step S206.

Content Addressable Memory (CAM) Table

FIG. 3A shows CAM Table 80, which maintains information regarding R_CTL values. CAM Table 80 is maintained in Random Access Memory (RAM) 80A, which is accessible by IOP 66 and receive port 69. As stated above, CAM table 80 is a master table for the switch, while each port can have its own CAM Table (80C).

Each entry in CAM Table has a R_CTL value and the associated maximum frame-length and minimum frame-length. CAM Table 80 is comprised of a column 300 that includes the R_CTL value, a column 301 that has the corresponding maximum frame-length information and a column 302 that has the minimum frame-length information.

Firmware adds the entries in the CAM table 80 (and also for CAM 80C, FIG. 1F) during the initialization of the switch. For example, for a typical Fibre Channel frame, entry corresponding to R_CTL values of 0x00 to 0x4F and 0X60 through 0XFF has a maximum frame-length value equal to 2148 bytes and a minimum frame-length value equal to 36 bytes. Similarly, for a Virtual Fabric frame, entry corresponding to R_CTL value equal to 0x50 has a maximum frame-length value equal to 2156 bytes and a minimum frame-length value equal to 44 bytes. Similarly, R_CTL values equal to 0x51 and 0x52 represent inter-fabric and encapsulated inter-fabric frames, respectively (i.e. frames with extended headers (see FIG. 2B)).

It is noteworthy that R_CTL values can be stored in any format in Random Access Memory and the term "table" is not to be construed as a limitation.

In one aspect of the present invention, R_CTL values are used to determine the maximum and minimum frame-length values of the received Fibre Channel frame. These values allows a receive port to check for frame length without causing data corruption.

It is noteworthy that different values for the minimum frame-length and/or maximum frame-length are used for different R_CTL values. Also CAM Table 80C provides default values for minimum frame-length and/or maximum frame-length if the extracted R_CTL values do not match stored R_CTL values.

It is also noteworthy that the present invention is not limited to any particular R_CTL, maximum/minimum frame length values. Switch element firmware operating under IOP 66 can program these values.

Frame Length Control Module

Figure 3B:
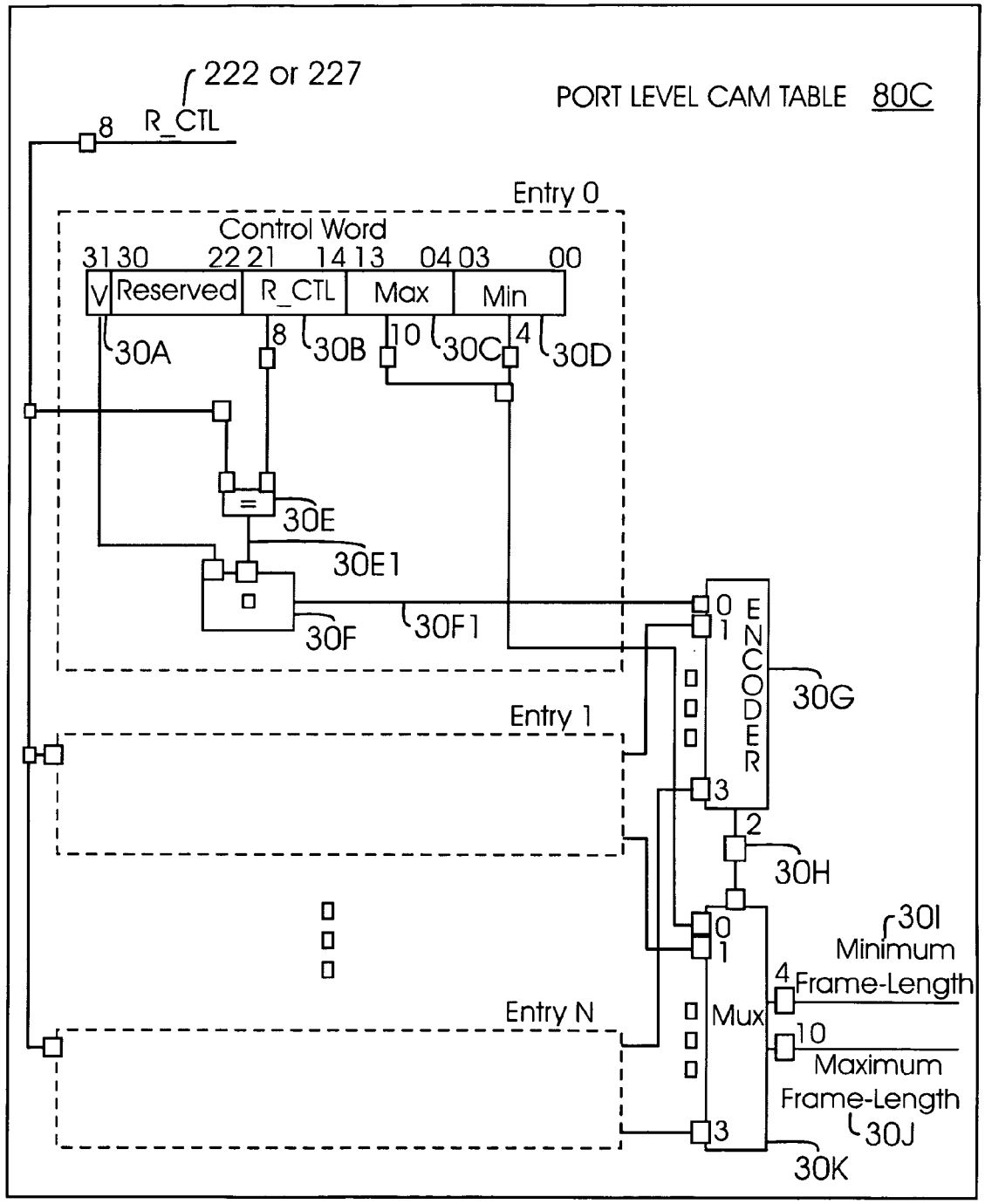
FIG. 3B shows a logic diagram for a port level CAM Table, according to one aspect of the present invention.

FIG. 3B shows a detailed logic diagram for implementing port level CAM Table 80C with entries 00 to entry N. CAM Table 80C is located in each receive port 69 and is used by one port or shared between plural ports. The term "Table" as used herein is not limit to a table that simply stores values, but denotes a system/logic for achieving the adaptive aspects of the present invention.

It is noteworthy that although various bit values are shown in FIG. 3B, the adaptive aspects of the present invention are not limited to any particular bit value.

Incoming frames information (or fields) (R_CTL 222/227) is compared by logic 30E with entry 30B. A valid/control bit 30A is set for a valid control word entry. Logic 30E generates a command/signal (output 30E1) based on the comparison. Output 30E1 is sent to logic 30F that generates a hit signal 30F1.

Output 30F1 is sent to an encoder module 30G, whose output 30H is sent to MUX 30K. Maximum frame-length 30C and minimum frame-length 30D are also sent to MUX 30K. MUX 30K selects maximum frame-length 30J and a minimum frame-length 30I depending on the input signal 30H. The selected maximum frame-length 30J and a minimum frame-length 30I values are shown as the entries in column 301 and 302 respectively in FIG. 3A.

The present invention is not limited to CAM table 80C as described above. A hashing table could also be used to implement the adaptive aspects of the present invention.

In one aspect of the present invention, frame length is checked efficiently and in real time. The foregoing process/system can accommodate the new standard Virtual Fabric and Inter-Fabric headers in previous Fibre Channel switch elements, without expensive upgrades.

Although the present invention has been described with reference to specific embodiments, these embodiments are illustrative only and not limiting. Many other applications and embodiments of the present invention will be apparent in light of this disclosure and the following claims.

What is claimed is:

1. A method for a port that receives Fibre Channel frames, comprising:
    (a) storing a maximum frame length value and a minimum frame length value for each of a plurality of Fibre Channel frame type; wherein the maximum frame length value and the minimum frame length value for each of the plurality of Fibre Channel frame type are associated with a R_CTL value, a field of a Fibre Channel frame header used for routing Fibre Channel frames;
    (b) extracting a R_CTL value from a frame header of a Fibre Channel frame received at the port;
    (c) comparing the extracted R_CTL value of the Fibre Channel frame with stored R_CTL values in step (a);
    (d) if the extracted R_CTL value matches with a stored R_CTL value in step (c), then comparing a frame length of the received Fibre Channel frame with a maximum frame-length and a minimum frame-length associated with the extracted and matched R_CTL value;
    (e) if the extracted R_CTL does not match with any stored R_CTL value in step (c), then comparing the frame length of the received Fibre Channel frame with a default maximum frame length value and a default minimum frame length value;
    (f) based on the comparison in step (d) and step (e), determining if the received Fibre Channel frame is a long frame or a short frame;
    wherein the received Fibre Channel frame is a long frame if the frame length of the received Fibre Channel frame is greater than the maximum frame length from step (d), if there was a match in step (c), or greater than the default maximum frame length from step (e), if there was no match in step (c); and the received Fibre Channel frame is a short frame if the frame length of the received Fibre Channel frame is less than the minimum frame length from step (d), if there was a match in step (c), or less than the default minimum frame length from step (e), if there was no match in step (c); and
    (g) discarding the received Fibre Channel frame if the frame is a long frame or a short frame.

2. The method of claim 1, wherein, if the received Fibre Channel frame is a long frame, then the received Fibre Channel frame is truncated to the maximum frame length if there was a match in step (c), or truncated to the default maximum frame length from step (e), if there was no match in step (c).

3. The method of claim 1, wherein if the received Fibre Channel frame is a short frame, then the received Fibre Channel frame is padded to the minimum frame length if there was a match in step (c) of claim 1, or padded to the default minimum frame length from step (e), if there was no match in step (c).

4. The method of claim 1, wherein if the received Fibre Channel frame is a long frame or a short frame, then a processor records the received Fibre Channel frame as an error for the port.

5. The method of claim 1, wherein a Content Addressable Memory accessible by a processor stores the maximum frame length, the minimum frame length, the default maximum frame length and the default minimum frame length values.

6. The method of claim 1, wherein the received Fibre Channel frame is routed if the frame is not a long frame or a short frame as determined in step (f).

7. The method of claim 1, wherein the minimum frame-length, the maximum frame-length, the default maximum frame length and the default minimum frame length values are programmable.

8. A Fibre Channel device element for receiving Fibre Channel frames, comprising:
    a memory for storing a maximum frame length value and a minimum frame length value for each of a plurality of Fibre Channel frame type; wherein the maximum frame length value and the minimum frame length value for each of the plurality of Fibre Channel frame type are associated with a R_CTL value, a field of a Fibre Channel frame header used for routing Fibre Channel frames; and
    a receive port that:
        (a) receives a Fibre Channel frame;
        (b) extracts a R_CTL value from the Fibre Channel frame;
        (c) compares the extracted R_CTL value of the Fibre Channel frame with R_CTL values stored in the memory;
        (d) if the extracted R_CTL value matches with a stored R_CTL value in (c), then compares a frame length of the received Fibre Channel frame with a maximum frame-length and a minimum frame-length associated with the extracted and matched R_CTL value;
        (e) if the extracted R_CTL does not match with any stored R_CTL value in (c), then compares the frame length of the received Fibre Channel frame with a default maximum frame length value and a default minimum frame length value;
        (f) based on the comparison in (d) and (e), determines if the received Fibre Channel frame is a long frame or a short frame; wherein the received Fibre Channel frame is a long frame if the frame length of the received Fibre Channel frame is greater than the maximum frame length from (d), if there was a match in (c), or greater than the default maximum frame length from (e), if there was no match in (c); and the received Fibre Channel frame is a short frame if the frame length of the received Fibre Channel frame is less than the minimum frame length from (d), if there was a match in (c), or less than the default minimum frame length from (e), if there was no match in (c); and (g) discards the received Fibre Channel frame if the frame is a long frame or a short frame.

9. The Fibre Channel device element of claim 8, wherein if the received Fibre Channel frame is a long frame, then the received Fibre Channel frame is truncated to the maximum frame length if there was a match in (c), or truncated to the default maximum frame length from (e), if there was no match in (c).

10. The Fibre Channel device element of claim 8, wherein if the received Fibre Channel frame is a short frame, then the received Fibre Channel frame is padded to the minimum frame length if there was a match in (c); or padded to the default minimum frame length from (e), if there was no match in (c).

11. The Fibre Channel device element of claim 8, wherein if the received Fibre Channel frame is a long frame or a short frame, then a processor records the received Fibre Channel frame as an error for the port.

12. The Fibre Channel device element of claim 8, wherein the maximum frame length, the minimum frame length, the default maximum frame length and the default minimum frame length values are stored in a Content Addressable Memory table stored in the memory accessible by a processor.

13. The Fibre Channel device element of claim 8, wherein the received Fibre Channel frame is routed if the frame is not a long frame or a short frame as determined in step (f).

14. The Fibre Channel device element of claim 8, wherein the minimum frame-length, the maximum frame-length, the default maximum frame length and the default minimum frame length values are programmable.

15. The Fibre Channel device element of claim 8, wherein the Fibre Channel device is a host bus adapter.

16. The Fibre Channel device element of claim 8, wherein the Fibre Channel device is a Fibre Channel Switch element.

17. A method for a network port for receiving and transmitting frames, comprising:

(a) storing a maximum frame length value and a minimum frame length value for each of a plurality of frame type; wherein the maximum frame length value and the minimum frame length value for each of the frame type are associated with a field value used for routing frames received by the port;

(b) extracting the field value from a frame header of a frame received at the port;

(c) comparing the field value of the frame with stored field values in step (a);

(d) if the extracted field value matches with a stored value in step (c), then comparing a frame length of the received frame with a maximum frame length and a minimum frame length associated with the extracted and matched field value;

(e) if the extracted field value does not match with any stored field value in step (c), then comparing the frame length of the received frame with a default maximum frame length value and a default minimum frame length value;

(f) based on the comparison in step (d) and step (e), determining if the received frame is a long frame or a short frame;

wherein the received frame is a long frame if the frame length of the received frame is greater than the maximum frame length from step (d), if there was a match in step (c), or greater than the default maximum frame length from step (e) if there was match in step (c); and the received frame is a short frame if the frame length of the received frame is less than the minimum frame length from step (d), if there was a match in step (c), or less than the default minimum frame length from step (e), if there was no match in step (c); and (g) discarding the received frame if the received frame is a long frame or a short frame.

18. The method of claim 17, wherein, if the received frame is a long frame, then the received frame is truncated to the maximum frame length if there was a match in step (c), or to the default maximum frame length from step (e), if there was no match in step (c).

19. The method of claim 17, wherein if the received frame is a short frame, then the received frame is padded to the minimum frame length if there was a match in step (c); or padded to the default minimum frame length from step (e), if there was no match in step (c).

20. The method of claim 17, wherein if the received frame is a long frame or a short frame, then a processor records the received frame as an error for the port.

21. The method of claim 17, wherein a Content Addressable Memory accessible by a processor stores the maximum frame length, the minimum frame length, the default maximum frame length and the default minimum frame length values.

22. The method of claim 17, wherein the maximum frame length, the minimum frame length, the default maximum frame length and the default minimum frame length values are programmable.

23. The method of claim 17, wherein the network port is a part of a switch element.

24. The method of claim 17, wherein the network port is a part of a network adapter.

* * * * *

UNITED STATES PATENT AND TRADEMARK OFFICE
CERTIFICATE OF CORRECTION

PATENT NO. : 7,548,560 B1  Page 1 of 1
APPLICATION NO. : 11/363365
DATED : June 16, 2009
INVENTOR(S) : Frank R. Dropps et al.

It is certified that error appears in the above-identified patent and that said Letters Patent is hereby corrected as shown below:

In column 4, line 3, delete "shares" and insert -- share --, therefor.

In column 4, line 29, delete "FIB." and insert -- FIG. --, therefor.

In column 4, line 32, delete "20port" and insert -- 20-port --, therefor.

In column 5, line 9, delete "receives" and insert -- receive --, therefor.

In column 5, line 23, delete "suplpy" and insert -- supply --, therefor.

Signed and Sealed this

Twenty-sixth Day of October, 2010

David J. Kappos
*Director of the United States Patent and Trademark Office*